Jan. 28, 1964     D. E. ATKINSON     3,119,266
LEVEL INDICATING SYSTEM, METHOD AND PROBE
Filed Nov. 10, 1960     2 Sheets-Sheet 1
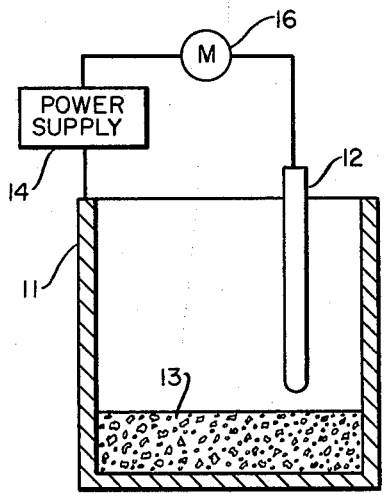
FIG. 1
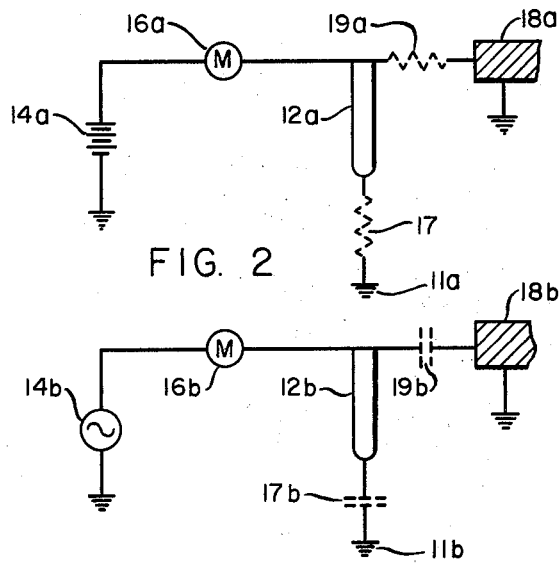
FIG. 2
FIG. 3
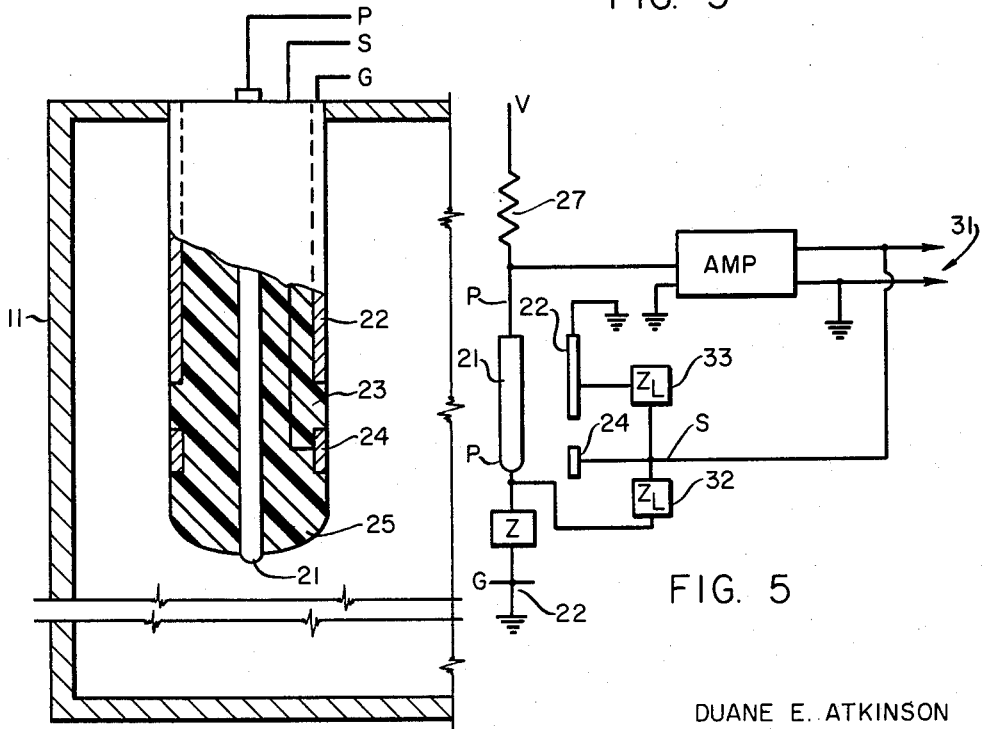
FIG. 4
FIG. 5
DUANE E. ATKINSON
*INVENTOR.*
BY
Flehr and Swain
ATTORNEYS Jan. 28, 1964   D. E. ATKINSON   3,119,266
LEVEL INDICATING SYSTEM, METHOD AND PROBE
Filed Nov. 10, 1960   2 Sheets-Sheet 2
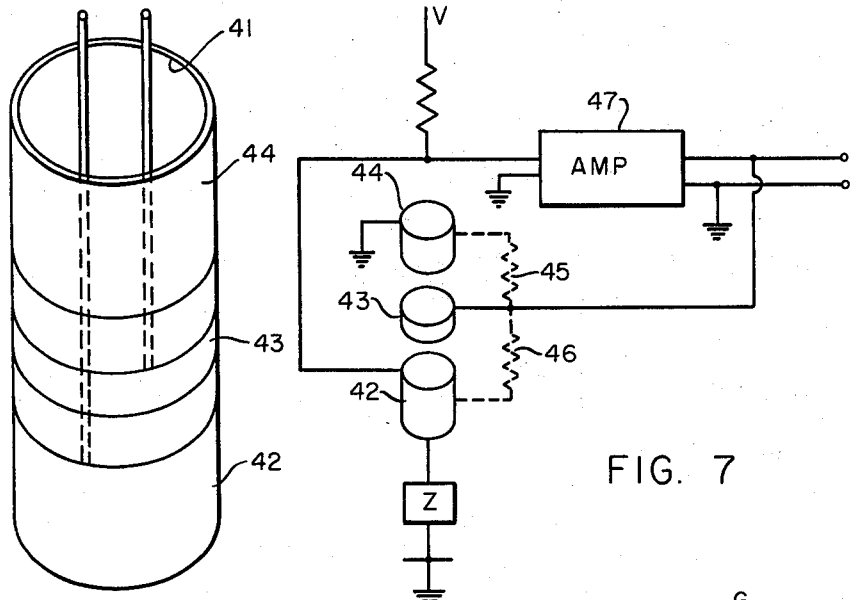
FIG. 6
FIG. 7
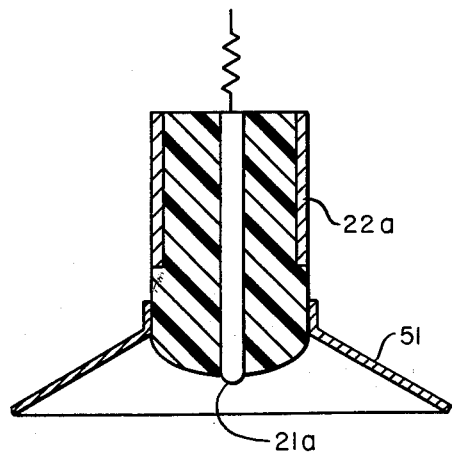
FIG. 8
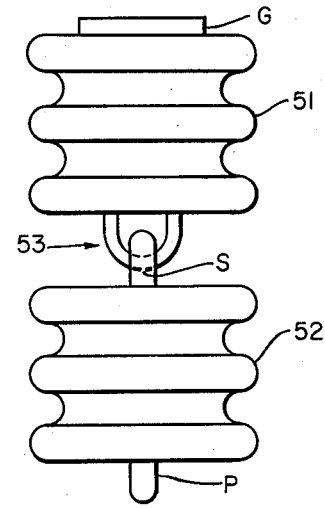
FIG. 9
DUANE E. ATKINSON
*INVENTOR.*
BY
*Flehr and Swain*
ATTORNEYS

United States Patent Office 3,119,266
Patented Jan. 28, 1964

3,119,266
LEVEL INDICATING SYSTEM, METHOD
AND PROBE
Duane E. Atkinson, 102 Fey Drive, Burlingame, Calif.
Filed Nov. 10, 1960, Ser. No. 68,445
7 Claims. (Cl. 73—304)

The present invention relates generally to a system, method and probe for detecting or measuring the level or quantity of liquid, powder granular or aggregate materials in bins, tanks or other containers, and more particularly to a system, method and probe for minimizing the effect of electrical leakage.

The present invention has application to a system for detecting a material when it reaches a predetermined level, or to a system in which the level is measured to give a continuous indication of quantity or level of a material. The present invention is applicable to measuring or detecting systems which operate on change of electrical impedance such as resistance or capacitance. When measuring is desired rather than mere level indication, alternating current is required whereby variations in capacitive reactance is used as an indication.

Measuring or indicating systems of the prior art employ probes of various configurations suspended so that they are brought into cooperative relationship with the material being measured. The probes include first and second conductive portions which are insulated one from another by electrical insulating material. The electrical impedance between the conductive portions is measured to give an indication of the level of the associated material.

Films of moisture, dust or other foreign matter on the surface of the insulating material give rise to electrical leakage. The films may be formed by the material being measured adhering to the probe surface. The magnitude of leakage between the conductive portions of the probe depends upon the character of the film and cannot be easily compensated since the surface conditions vary.

The leakage provides shunt impedance which introduces errors in the measurement of the electrical impedance between the conductive portions and this gives an erroneous indication of level. Furthermore, in many instances, the shunt impedance introduced by the film may be so low in comparison to the impedance of the material being measured that a large proportion of the probe current travels through the leakage path and makes it relatively difficult to obtain any indication of the magnitude of the desired electrical characteristic.

Certain capacitive type measuring systems of the prior art have included means for deriving a correcting or compensating signal which is dependent upon electrical leakage. An additional probe portion is provided in insulated relationship with one of the measuring portions with substantially the same insulating path as that of the measuring circuit. It is, of course, apparent that this type of correction depends upon a leakage path which is identical to the reference path. Furthermore, systems of this type are relatively complicated since not only is there required an additional path, but additional circuitry for developing and using the compensating signal.

It is an object of the present invention to provide an improved system, method and probe for minimizing the effects of leakage on detecting and measuring systems.

It is another object of the present invention to provide a system, method and probe in which the leakage impedance is effectively multiplied so that its shunt effect is minimized.

It is another object of the present invention to provide a system and probe associated therewith in which the electric leakage paths are interrupted by a guard electrode.

It is a further object of the present invention to provide a material level indicating system which is simple in construction and relatively inexpensive.

Summarizing, the present invention provides a probe including first and second conductive electrodes and a guard electrode which is driven in phase with the voltage derived between the measuring electrodes with a voltage of substantially the same magnitude as the measuring voltage. This effectively multiplies the shunt impedance introduced by a leakage path.

These and other objects of the invention will become more clearly apparent from the following description when taken in conjunction with the accompanying drawing.

Referring to the drawing:

FIGURE 1 schematically shows a measuring system including a probe;

FIGURE 2 is a schematic diagram showing the system of FIGURE 1 used as a resistive level measuring system;

FIGURE 3 shows the system of FIGURE 1 used as a capacitive level measuring system;

FIGURE 4 is an elevational view, partly in section, showing a portion of a tank with a probe incorporating the present invention extending downwardly into the same to measure the level of material therein;

FIGURE 5 is a circuit diagram showing the system of the present invention and additionally illustrating the leakage paths;

FIGURE 6 shows another probe configuration for use in accordance with the present invention;

FIGURE 7 is a circuit diagram of a system connected to a probe of the type shown in FIGURE 6;

FIGURE 8 is a schematic diagram showing a capacitive probe in accordance with the invention; and FIGURE 9 shows a probe incorporating the present invention for use in bins containing aggregate and the like.

Referring to FIGURE 1, there is shown a bin 11 with an electrode 12 suspended therein. The material to be measured is shown at 13. A power supply 14 applies a suitable voltage between the bin 11 and electrode 12. If the bin 11 in nonconductive, an additional electrode may be provided. A meter 16 indicates the magnitude of the current flowing between the electrode 12 and the bin 11. As will be presently described, the power supply may apply an alternating current voltage whereby the variations of impedance between the electrode and bin as the material rises is measured, or the power supply may apply a direct current voltage whereby the change in resistance between the electrode and bin when the material rises and strikes the electrode is detected.

FIGURE 2 shows the system of FIGURE 1 connected to a direct current (D.-C.) voltage source 14a through a meter 16a to the electrode 12a. The dotted resistor 17 represent the resistance offered by the material between the electrode 12a and the bin 11a. The metal portion 18a represents the upper wall of the bin. The electrode 12a is supported from upper wall 18a by suitable electrical insulating material. Leakage paths will exist between the probe and the bin along the surface of the insulation. These leakage paths are in parallel with the path offered by the material being measured and are represented by the dotted resistance 19a. The current flowing through the leakage path will add to the current measured by the meter 16a. As a result, there can be an erroneous level indication. This is especially true when the resistance of the material being measured is relatively high. For then, the shunt or leakage resistance may be appreciable in comparison thereto and may even mask out the change in resistance due to the material completing the path between the probe and ground (bin).

FIGURE 3 illustrates a circuit similar to that of FIG-

URE 1 in which an alternative current voltage of a relatively high frequency is applied between the electrode 12b and the bin 11b. The bin is shown at 18b, and shunt leakage capacitance will exist between the probe and adjacent bin. This is shown at 19b. The leakage capacitance and resistance will result in an erroneous level indication.

Referring to FIGURE 4, there is schematically illustrated a probe in accordance with the invention. The probe includes electrode 21 disposed coaxially within a cylindrical member 22. Suitable electrical insulation 23 is provided between the electrode 21 and cylindrical member 22. The cylindrical member 22 is electrically and physically connected to the tank or bin to support the probe assembly within the tank. In certain instances, the tank itself may form the member 22, the probe includes a guard electrode or shield 24 which interrupts the electrical leakage paths between the electrodes 21 and member 22 along the surface of the insulation 23. The lines P (probe), S (shield) and G (ground or reference) indicate the connections to the electrodes 21 and 24 and to member 22, respectively.

Referring to FIGURE 5, the various electrodes are schematically shown connected in a measuring system. A suitable driving voltage V is applied between the electrode 21 (P) and grounded to member 22 (G). With substantially constant applied voltage, a change in impedance Z (corresponding to capacitance 17b in FIGURE 3) between the probe and grounded member 22 (G) will result in a change in current flow through resistor 27 and impedance Z. If a guard electrode 24 were not present, there would be a path along the surface of the insulating material 23 (FIGURE 4) to the member 22. This path is in shunt with the impedance Z. That is, there will be a leakage path between the probe 21 and the cylinder member 22, as well as a path between the electrode 21 through the material to the tank 11 connected to member 22.

In accordance with the present invention, an amplifier is fed by the signal between bin 11 or member 22 and the probe 21, the output signal. The amplifier preferably has a high input impedance, low output impedance, substantially, but less than, unity gain, no phase shift and no waveform distortion whereby the output signal is substantially the same amplitude, phase and waveform as the input signal. The amplifier, among other things, isolates the probe from the indicating circuits. A suitable amplifier may, for example, be a cathode follower or emitter follower amplifier. Input voltage is applied to one terminal of resistor 27 connected in series with impedance Z to form a voltage dividing network. With constant applied input voltage, the output signal applied to the amplifier will decrease as the impedance between the probe 21 and the bin decreases, and will increase as the impedance increases since one element, the resistor 27, of the voltage dividing network is fixed. The amplifier amplifies the probe output voltage. The amplified voltage appears at the output terminals 31 for application to associated indicating equipment. The amplified output voltage is also applied between ground, the member 22 and the guard shield 24.

By selecting an amplifier which has high input impedance, low output impedance, gain substantially equal to but less than unity and output phase (or polarity) corresponds to the input voltage phase (or polarity), the guard electrode or shield 24 is driven in such a manner as to greatly multiply the resistance between the electrode 21 and member 22 along the leakage path. The guard electrode 24 will follow substantially the voltage at the electrode 21. The guard electrode 24 serves to provide a connection to the leakage path at a point between the electrode 21 and member 22. Since the guard electrode 24 is driven by a voltage in phase with the output signal and of substantially the same amplitude as the output signal applied to the amplifier, the electrode 24 will rise and fall with the voltage on the electrode 21. The voltage between the probe and guard shield will always be a minimum since the voltages at the probe and guard shield will be substantially equal except for the amount less than unity of the gain of the amplifier. Thus, in effect, a very small voltage will appear across the leakage impedance 32 between the guard shield and probe 21, while a relatively large voltage will appear across the leakage impedance 33 between the guard shield and electrode 22. Thus, the shunt currents are negligible. Currents flowing between the guard shield 24 and electrode 22 do not affect the voltage output of the amplifier since the amplifier has very low output impedance. The amplifier will not load the circuit because of its high input impedance.

Another way of looking at the foregoing effect is to consider that the leakage impedance 32 has been "multiplied" by the factor $$\frac{A}{1-A}$$

where A is the gain of the amplifier.

In effect then, the voltage on the electrode 24 connected to the leakage impedance serves to rise and fall with the voltage from the probe in such a manner that the voltage across the portion of leakage impedance between the probe and guard ring is minimized to thereby reduce the leakage currents.

In FIGURE 6, there is shown a resistive probe which can be formed by depositing metal over selected areas of an insulating sleeve 41. The metal 42 forms the probe; the metal 43 forms the guard ring; and the metal 44 is connected for support of the probe assembly. The action of the probe illustrated in FIGURE 6 may be more clearly understood with respect to FIGURE 7 wherein a voltage source applies a suitable voltage between the probe 42 and ground. To minimize the effect of any leakage through the leakage resistance 46 and 45, the guard ring 43 is driven from the amplifier 47 of the type previously described which serves to drive the guard ring in phase with the input voltage to the amplifier and at a gain slightly less than unity. The effect is as previously described to raise the effective impedance of the leakage resistance 46.

Referring to FIGURE 8, there is shown a probe which may be employed for capacitive measurements. The probe includes a guard shield 51 which intercepts any resistive path between the probe or electrode 21a and the cylindrical member 22a. Furthermore, the shield 51 extends outwardly whereby it will intercept substantially all the electrostatic field between the electrode 21a and member 22a. The shield 51 is driven as previously described and nullifies any shunt leakage currents both resistive and capacitive which might flow between the electrode 21a and member 22a.

In FIGURE 9, there is illustrated a probe suitable for use in bins or tanks having aggregate material. The probe includes insulators 51 and 52. The insulator 52 is movably secured to the insulator 51 by a metallic joint 53. Thus, when the material strikes the lower insulator, it can move or swing whereby it will not be damaged. The metallic joint forms the guard shield (S) by interrupting the leakage path along the surface of the insulators 51 and 52. The upper insulator is suitably attached to the tank or bin. A probe (P) is carried by the lower insulator. The connection to the probe extends upwardly through the insulators. The connecting lead is not shown. Operation of the probe is the same as previously described.

Thus, it is seen that there is provided a novel probe including a measuring electrode or probe and a mounting member insulated therefrom. A guard electrode interrupts the leakage path between the measuring electrode and the mounting member along the insulators. The guard electrode is electrically driven in such a manner that it follows substantially the voltage on the measuring probe. This results in the leakage impedance being effectively multiplied so that it does not appreciably affect the measurement of impedance between the measuring probe and the bin or other electrode and elements attached thereto. The system for carrying out the foregoing includes an amplifier having high input impedance, low output impedance, very nearly unity gain and zero phase shift connected to receive the measuring probe voltage, operate on the same, and apply it to the guard electrode.

It will be apparent that the present invention may be employed on conventional probes having a pair of electrodes supported in spaced relationship by the addition of a guard electrode in the leakage path and the provision of a suitable driving voltage to the guard electrode.

I claim:

1. A system for measuring the level of materials comprising a conductive electrode, a conductive member, insulating means supporting the electrode from the member and a guard shield interrupting the electrical leakage paths between the electrode and member, means for applying a voltage between said electrode and member, and an amplifier connected to receive the voltage between said electrode and member and having an amplifier output voltage which is in phase and substantially equal to but less than the voltage between said electrode and member, means for applying said amplifier output voltage between the guard shield and one of said electrode and member.

2. A system for measuring the level of materials comprising a conductive electrode, a conductive member, insulating means supporting the electrode from the member, and a guard shield interrupting the electrical leakage paths along the insulation between said electrode and member, means for applying a voltage between said electrode and member, amplifying means having first and second input terminals connected to the electrode and member respectively to receive the voltage between the same and first and second output terminals for supplying the amplifier output voltage, said second input terminal and said second output terminal connected in common, and means for connecting the first output terminal to the guard electrode, said amplifier having substantially unity gain and zero phase shift whereby the amplified voltage applied to the guard electrode is of substantially the same magnitude and phase as the voltage at the first input terminal.

3. A system as in claim 2 in which said amplifier has a relatively high input impedance and a relatively low output impedance.

4. A system for measuring a predetermined level of material comprising a conductive electrode, a conductive member electrically connected to the material being measured, insulating means supporting the electrode from the member, a guard shield interrupting leakage paths between the electrode and member, means for applying a voltage between the electrode and member, amplifying means connected to receive the voltage appearing between the electrode and member and serving to amplify the same, said amplifying means serving to provide an amplified output voltage which is in phase with and substantially equal but less than the voltage between the electrode and member, and means for applying the amplifier output voltage to the guard shield whereby the voltage between the guard shield and the electrode is relatively small to thereby minimize the leakage between the electrode and the member.

5. A system as in claim 4 wherein said member comprises a cylinder surrounding the electrode and wherein the electrode is supported from the member by insulating material.

6. A system for measuring a predetermined level of material comprising a conductive electrode, a conductive member electrically connected to the material being measured, insulating means supporting the electrode from the member, a guard shield interrupting leakage paths between the electrode and the member, means for applying a direct current voltage between the electrode and member, amplifying means connected to receive the voltage appearing between the electrode and member and serving to amplify the same, said amplifying means serving to provide an amplified output voltage of the same polarity and substantially equal to but less than the voltage between the electrode and member, and means for applying the amplifier output voltage to the guard shield whereby the voltage between the guard shield and the electrode is relatively small to thereby minimize the leakage between the electrode and the member.

7. The method of minimizing electrical leakage in a system for measuring the level of material of the type including a probe having first and second spaced electrodes for having voltage applied thereto and between which is developed an output voltage corresponding to the electrical impedance between the same, said electrical impedance including two components which appear essentially in parallel: a first component due to the impedance of the material in the electrical path between the electrodes and a second component due to the electrical leakage between the electrodes; the method comprising the steps of applying a voltage between said electrodes, developing a voltage which is in phase and substantially equal to but less than the voltage between said electrodes, and applying said last voltage in the electrical leakage path between the measure electrodes to entirely interrupt the path.

References Cited in the file of this patent

UNITED STATES PATENTS

| 2,849,882 | Lee | Sept. 2, 1958 |
| 2,908,166 | Johnson | Oct. 13, 1959 |
| 2,945,165 | Franzel | July 12, 1960 |
| 2,950,426 | Frome | Aug. 23, 1960 |

OTHER REFERENCES

Navships 900,016, Radar Electronic Fundamentals, Washington, D.C., June 1944; pp. 131–132, Government Printing Office.